United States Patent
Shinohara et al.

(10) Patent No.: US 12,224,685 B2
(45) Date of Patent: Feb. 11, 2025

(54) MOTOR CONTROL DEVICE AND MOTOR CONTROLLING METHOD

(71) Applicant: HITACHI ASTEMO, LTD., Hitachinaka (JP)

(72) Inventors: Naoki Shinohara, Hitachinaka (JP); Keisuke Suzuki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 153 days.

(21) Appl. No.: 17/924,633

(22) PCT Filed: Jan. 29, 2021

(86) PCT No.: PCT/JP2021/003174
§ 371 (c)(1),
(2) Date: Nov. 10, 2022

(87) PCT Pub. No.: WO2021/245974
PCT Pub. Date: Dec. 9, 2021

(65) Prior Publication Data
US 2023/0188067 A1    Jun. 15, 2023

(30) Foreign Application Priority Data
Jun. 1, 2020 (JP) ................. 2020-095753

(51) Int. Cl.
*B60L 15/20* (2006.01)
*H02P 21/05* (2006.01)
(52) U.S. Cl.
CPC .......... *H02P 21/05* (2013.01); *B60L 15/2009* (2013.01); *B60L 2240/423* (2013.01)
(58) Field of Classification Search
CPC ................. H02P 21/05; B60L 15/2009; B60L 2240/423; B60L 15/20
See application file for complete search history.

(56) References Cited

U.S. PATENT DOCUMENTS

2009/0175601 A1    7/2009    Ikeda
2014/0176036 A1    6/2014    Hagihara
(Continued)

FOREIGN PATENT DOCUMENTS

JP    2005-151797 A    6/2005
JP    2014-128089 A    7/2014
(Continued)

OTHER PUBLICATIONS

International Search Report with English Translation and Written Opinion in International Application No. PCT/JP2021/003174 dated May 18, 2021.

*Primary Examiner* — Cortez M Cook
(74) *Attorney, Agent, or Firm* — Foley & Lardner LLP (57) ABSTRACT

Provided is a motor control device that can reduce an error component resulting from braking or the like to bring an estimated motor speed closer to an actual motor speed, thereby improving the accuracy of control of a motor. The motor control device includes a controller 6 that outputs a first torque instruction signal that is an instruction to specify a torque of an electric motor 1, and a damping control unit 500. The damping control unit 500 includes a first high-pass filter 50*f* that receives input of a motor speed signal indicating a speed of the electric motor 1, the first high-pass filter 50*f* outputting a first signal, a second high-pass filter 50*d* that receives input of an estimated motor speed signal obtained from the first torque instruction signal, the second high-pass filter 50*d* outputting a second signal, and a low-pass filter 50*g* that receives input of a motor speed deviation signal indicating a deviation between the first signal and the second signal, the low-pass filter 50*g* obtaining a low-frequency component from the motor speed deviation signal and outputting the low-frequency component as a third signal.

8 Claims, 8 Drawing Sheets

(56) References Cited

U.S. PATENT DOCUMENTS

| | | | |
|---|---|---|---|
| 2015/0127202 A1* | 5/2015 | Itou | B60L 15/20 |
| | | | 701/22 |
| 2018/0056811 A1 | 3/2018 | Iwahana | |
| 2018/0264947 A1 | 9/2018 | Suzuki | |
| 2018/0331634 A1 | 11/2018 | Sumioka | |
| 2021/0194402 A1* | 6/2021 | Kimura | H02P 29/40 |

FOREIGN PATENT DOCUMENTS

| | | |
|---|---|---|
| JP | 2018-189930 A | 11/2018 |
| WO | WO-2007/091319 A1 | 8/2007 |
| WO | WO-2016/158720 A1 | 10/2016 |
| WO | WO-2017/033637 A1 | 3/2017 |

\* cited by examiner

FIRST EMBODIMENT

MOTOR CONTROL DEVICE AND MOTOR CONTROLLING METHOD

TECHNICAL FIELD

The present invention relates to a motor control device and a motor controlling method.

BACKGROUND ART

Improving the driver's operability in driving an electric car has been in demand. The driver's operability is improved by improving the precision of control of a motor used in the car to achieve better responsiveness.

PTL 1 discloses a driving force controller of an electric vehicle, the controller improving processing speed and responsiveness in anti-slipping control by the electric vehicle.

According to the technique described in PTL 1, a target torque is calculated, based on a driver's operation of an accelerator, to determine a target acceleration, and the actual rotation of a motor is detected and differentiated to determine an actual acceleration. Then, a correction amount representing an amount of correction of a motor torque instruction value is calculated so that a deviation between the target acceleration and the actual acceleration is reduced, and the calculated correction amount is processed through a high-pass filter to calculate a correction torque. Further, the correction torque is added to the motor torque instruction value to calculate a control motor torque.

According to the technique described in PTL 1, when the vehicle starts or detects a slip, a cutoff frequency of the high-pass filter is changed to one that is smaller than a cutoff frequency during normal driving in execution of anti-slipping control.

In addition, according to the technique described in PTL 1, correction for suppressing torsional vibrations is carried out.

The technique disclosed in PTL 1 involves a possibility that a change in a motor speed caused by a disturbance torque resulting from a braking operation, slope resistance, or the like, may be taken to be a vibration. To deal with this problem, the high-pass filter is added to simulator following control to prevent such a case.

CITATION LIST

Patent Literature

PTL 1: WO 2016/158720

SUMMARY OF INVENTION

Technical Problem

However, in a vehicle having a low resonance frequency, distinguishing motor speed variation caused by torsional vibrations from motor speed variation caused by a disturbance component, such as braking, is difficult. In the configuration of PTL 1, correction against a disturbance factor, such as braking, is not sufficient and therefore a possibility of erroneous calculation of a correction torque cannot be denied.

The present invention has been conceived to solve the above problem, and it is therefore an object of the present invention to provide a motor control device and a motor controlling method that even in a vehicle having a low resonance frequency, can reduce an error component resulting from braking or the like to bring an estimated motor speed closer to an actual motor speed, thereby improving the accuracy of control of a motor.

Solution to Problem

In order to achieve the above object, the present invention is configured as follows.

A motor control device includes a controller that outputs a first torque instruction signal that is an instruction to specify a torque of an electric motor, and a damping control unit. The damping control unit includes: a first high-pass filter that receives input of a motor speed signal indicating a speed of the electric motor, the first high-pass filter outputting a first signal; a second high-pass filter that receives input of an estimated motor speed signal obtained from the first torque instruction signal, the second high-pass filter outputting a second signal; and a low-pass filter that receives input of a motor speed deviation signal indicating a deviation between the first signal and the second signal, the low-pass filter obtaining a low-frequency component from the motor speed deviation signal and outputting the low-frequency component as a third signal.

A motor controlling method includes: outputting a first torque instruction signal from a controller, the first torque instruction signal being an instruction to specify a torque of an electric motor; inputting a motor speed signal to a first high-pass filter, the motor speed signal indicating a speed of the electric motor, and outputting a first signal; inputting an estimated motor speed signal obtained from the first torque instruction signal, to a second high-pass filter and outputting a second signal; and inputting a motor speed deviation signal to a low-pass filter, the motor speed deviation signal indicating a deviation between the first signal and the second signal, and obtaining a low-frequency component from the motor speed deviation signal to output the low-frequency component.

Advantageous Effects of Invention

A motor control device and a motor controlling method that can reduce an error component resulting from braking or the like to bring an estimated motor speed closer to an actual motor speed, thereby improving the accuracy of control of a motor can be provided.

DESCRIPTION OF EMBODIMENTS

Embodiments of the present invention will hereinafter be described with reference to the accompanying drawings.

Figure 1:
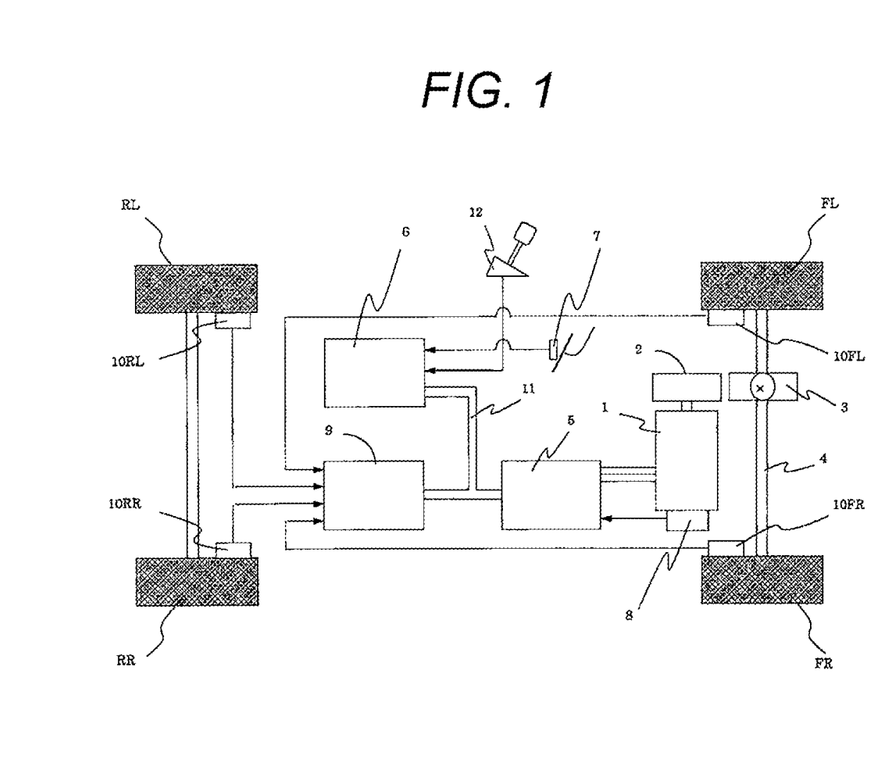
FIG. 1 is a schematic configuration diagram of an electric vehicle to which a motor control device according to a first embodiment of the present invention is applied.

Embodiments (First Embodiment) FIG. 1 is a schematic configuration diagram of an electric vehicle to which a motor control device according to a first embodiment of the present invention is applied.

The electric vehicle shown in FIG. 1 is a front wheel drive vehicle (two-wheel drive vehicle) in which front wheels FL and FR are driven by an electric motor 1. To the electric motor 1, a differential gear 3 is connected via a speed-reducing mechanism 2. To the differential gear 3, a drive shaft 4 is connected. To the drive shaft 4, the front wheels FL and FR are connected.

To the electric motor 1, power is supplied from a high-voltage battery (not illustrated) via an inverter 5. The inverter 5 is driven under control by a vehicle controller 6 and a control unit in the inverter 5.

The electric vehicle includes a shift lever 12 that outputs a range position signal indicating a traveling mode of the vehicle, and an accelerator opening sensor 7 that outputs an accelerator opening signal. The vehicle controller 6 includes a reception unit that receives a range position signal from the shift lever 12 and an accelerator opening signal from the accelerator opening sensor 7.

Based on an accelerator opening or the like, the vehicle controller 6 calculates a driving torque instruction value to the electric motor 1, and drives the inverter 5 according to the driving torque instruction value. The inverter 5 includes a reception unit that receives a motor rotor position from a resolver 8, has a function of calculating a motor rotating speed from the motor rotor position, and includes a damping control unit 500 (shown in FIG. 2) that calculates a second torque instruction value from a first torque instruction signal and a motor rotating speed that are inputted to the damping control unit 500.

The shift lever 12, which is operated by a driver, outputs a range position signal indicative of a parking range (P range) when the vehicle is stopped, a range position signal indicative of a neutral range (N range) when power is not transmitted, a range position signal indicative of a drive range (D range) when the vehicle moves forward, and a range position signal indicative of a reverse range (R range) when the vehicle moves backward.

A brake controller 9 is connected to wheel speed sensors 10FL, 10FR, 10RL, and 10RR attached respectively to wheels FL, FR, RL, and RR, and receives respective rotation speed signals from the wheels FL, FR, RL, and RR. The brake controller 9 adjusts the amount of a brake fluid supplied to respective brake units of the wheels FL, FR, RL, and RR, based on an amount of the driver's braking operation, thus controlling respective braking torques of the wheels FL, FR, RL, and RR. Information communication between the inverter 5, the vehicle controller 6, and the brake controller 9 is carried out through a CAN communication line (communication device) 11.

Figure 2:
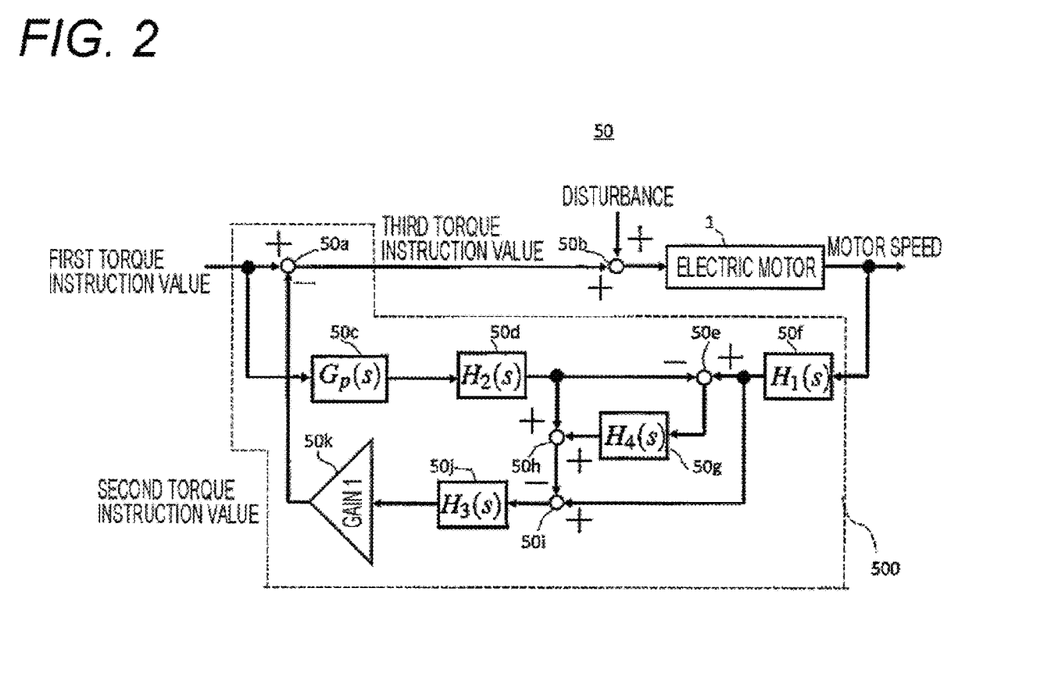
FIG. 2 is a configuration diagram of a damping control system according to the first embodiment.

FIG. 2 is a configuration diagram of a damping control system 50 according to the first embodiment.

In FIG. 2, a first torque instruction value (first torque instruction signal) is outputted from the controller 6 to a first subtractor 50a. The first subtractor 50a then subtracts a second torque instruction value (second torque instruction signal), which is outputted from a first amplifier 50k, from the first torque instruction value to give a third torque instruction value (third torque instruction signal). The third torque instruction value is outputted to a first adder 50b, which adds a disturbance component to the third torque instruction value and outputs it to the electric motor 1 to be controlled.

The first torque instruction value has overall vehicle inertia and integral characteristics, and is inputted to a second subtractor 50e via a motor speed estimator 50c, which does not take account of torsional vibrations, and a second high-pass filter 50d. A motor speed of the electric motor 1 is inputted to a first high-pass filter 50f. Subsequently, a signal outputted from the first high-pass filter 50f is inputted to the second subtractor 50e, where an output signal from the second high-pass filter 50d is subtracted from the signal inputted to the second subtractor 50e.

A signal resulting from the subtraction at the second subtractor 50e is inputted to a second adder 50h via a low-pass filter 50g, and is added to an output signal from the second high-pass filter 50d. An output signal from the second adder 50h is inputted to a third subtractor 50i, where the output signal from the second adder 50h is subtracted from an output signal from the first high-pass filter 50f.

Subsequently, an output signal from the third subtractor 50i is inputted to the first subtractor 50a via a third high-pass filter 50j and the first amplifier 50k.

A section demarcated by a broken line in FIG. 2, the section including elements (the first subtractor 50a, the second subtractor 50e, the third subtractor 50i, the second adder 50h, the motor speed estimator 50c, the first high-pass filter 50f, the second high-pass filter 50d, the third high-pass filter 50j, the low-pass filter 50g, and the first amplifier 50k), is defined as a damping control unit 500.

The damping control unit 500 is included in the inverter 5. The damping control unit 500, however, may be included in the vehicle controller 6.

Respective characteristics ($H1(s)$, $H2(s)$, $H3(s)$) of the first high-pass filter 50f, the second high-pass filter 50d, and the third high-pass filter 50j are expressed by the following equation (1).

$$Hi(s) = s/(s+\omega i) \qquad (1)$$

The characteristics H4(s) of the low-pass filter 50g are expressed by the following equation (2).

$$H4(s) = \omega 4/(s+\omega 4) \quad (2)$$

The characteristics Gp(s) of the motor speed estimator 50c are expressed by the following equation (3).

$$Gp(s) = 1/Js \quad (3)$$

In the above equations (1), (2), and (3), i denotes 1 to 3, and s denotes a Laplace operator. Because these equations are continuous systems, the equations (1) to (3) are each converted into a discrete system by bilinear transformation or the like when applied to practical cases.

ωi and ω4 denote cutoff angular frequencies, which determine respective characteristics of the filters 50d, 50f, 50g, and 50j. In the first embodiment, at least the characteristics H1(s) and the characteristics H2(s) are equivalent to each other. J denotes motor-side rotational inertia that is calculated with motor rotational inertia, wheel rotational inertia, vehicle weight, etc., being taken into consideration.

It should be noted that high-pass filters 50f, 50d, and 50j and a low-pass filter 50g that are different from the high-pass filters and the low-pass filter defined by the above equations (1) and (2) may be adopted, providing that the high-pass filters and the low-pass filter offer the same characteristics. The high-pass filters 50f, 50d, and 50j and low-pass filter 50g may be not primary filters but secondary filters. In addition, J in the equation (3) may be a factor different from the motor-side rotational inertia, providing that the factor is calculated on the assumption that a drive system of the vehicle is a single inertia system.

In the damping control system 50, a motor speed signal passes through the first high-pass filter 50f, which yields a first signal. A first torque instruction signal is inputted to the motor speed estimator 50c, which yields an estimated motor speed signal. This estimated motor speed signal passes through the second high-pass filter 50d, which yields a second signal.

Then, a motor speed deviation signal indicating a deviation between the first signal and the second signal (first signal-second signal) passes through the low-pass filter 50g, where a low-frequency component is obtained to yield a third signal. A signal given by adding up the second signal and the third signal is subtracted from the first signal to yield a feedback signal. A second torque instruction value (second torque instruction signal) based on the feedback signal is fed back to the first torque instruction value (first torque instruction signal). This yields a third torque instruction value (third torque instruction signal) outputted to the electric motor 1 to be controlled.

This process sufficiently reduces a possibility of occurrence of a case where a change in the motor speed caused by a braking operation or traveling on a slope is taken to be a vibration and a correction torque is calculated erroneously. As a result, torque changes that give the driver an uncomfortable feeling are reduced.

Figure 3:
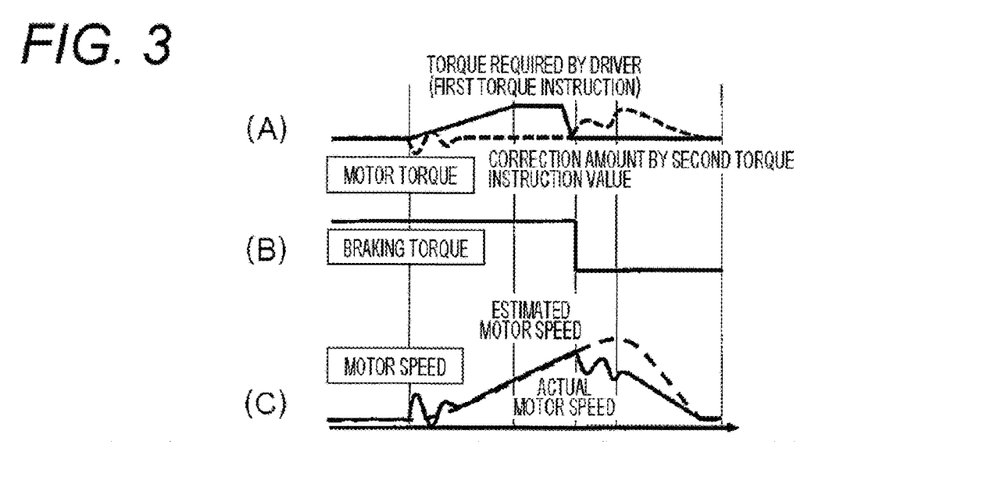
FIG. 3 is an operation explanation waveform chart of a comparative example, the operation explanation waveform chart being shown for explaining effects achieved by the first embodiment of the present invention.

FIG. 3 is an operation explanation waveform chart of a comparative example, the operation explanation waveform chart being shown for explaining effects achieved by the first embodiment of the present invention. Waveforms shown in FIG. 3 result in the comparative example in which the low-pass filter 50g is omitted from the damping control system 50 shown in FIG. 2 and the deviation signal indicating the deviation between the first signal and the second signal is used as the feedback signal. A signal based on the feedback signal is fed back to the first torque instruction value to yield an instruction value outputted to the electric motor 1 to be controlled.

Figure 4:
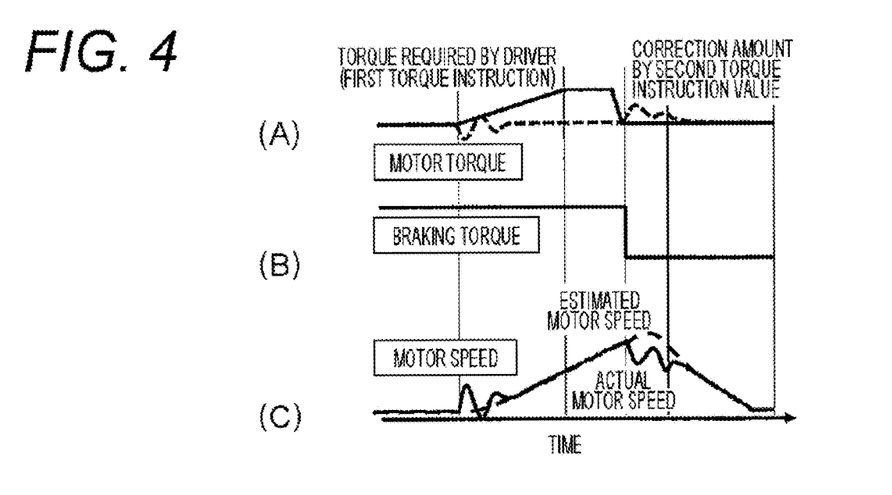
FIG. 4 is an operation explanation waveform chart of the damping control system according to the first embodiment of the present invention.

(A) of FIG. 3 shows waveforms of the motor torque, in which a solid line represents the first torque instruction value that is a torque required by the driver, and a broken line represents a correction amount by the second torque instruction value. (B) of FIG. 3 shows a wave form of the braking torque. (C) of FIG. 3 shows waveforms of the motor speed, in which a solid line represents an actual motor speed and a broken line represents an estimated motor speed. FIG. 4 is an operation explanation waveform chart of the damping control system 50 shown in FIG. 2 according to the first embodiment of the present invention shown in FIG. 2.

(A) of FIG. 4 is waveforms of the motor torque, in which a solid line indicates the first torque instruction value that is a torque required by the driver, and a broken line indicates a correction amount by the second torque instruction value. (B) of FIG. 4 shows a waveform of the braking torque. (C) of FIG. 4 shows waveforms of the motor speed, in which a solid line represents an actual motor speed and a broken line represents an estimated motor speed. By comparing the waveforms shown in FIG. 3 with the waveforms shown in FIG. 4, it is understood that the correction amount by the second torque instruction value in the comparative example shown in FIG. 3 is larger than the same in the first embodiment of the present invention shown in FIG. 4.

It is also understood that a difference between the estimated motor speed and the actual motor speed in the comparative example shown in FIG. 3 is larger than the same in the first embodiment of the present invention shown in FIG. 4.

This is because that in the comparative example shown in FIG. 3, because of the low-pass filter 50g being not included therein, a change in the motor speed caused by a braking operation or traveling on a slope is taken to be a vibration and consequently a correction torque is calculated.

Actually, however, the first high-pass filter 50f and the second high-pass filter 50d work in such a way as to prevent divergence of an estimate by the motor speed estimator 50c. As a result, an actual waveform of the estimated motor speed turns out to be different from the waveforms of the estimated motor speed shown in FIGS. 3 and 4. FIGS. 3 and 4 show waveforms simplified for understanding of effects of the present invention.

As described above, according to the first embodiment of the present invention, a motor control device and a motor controlling method that can reduce an error component resulting from braking or the like to bring the estimated motor speed closer to the actual motor speed, thereby improving the accuracy of control of the motor can be provided.

Although the example shown in FIG. 2 includes the first amplifier 50k, this first amplifier 50k may be omitted from the example.

Second Embodiment

A second embodiment of the present invention will then be described.

Figure 5:
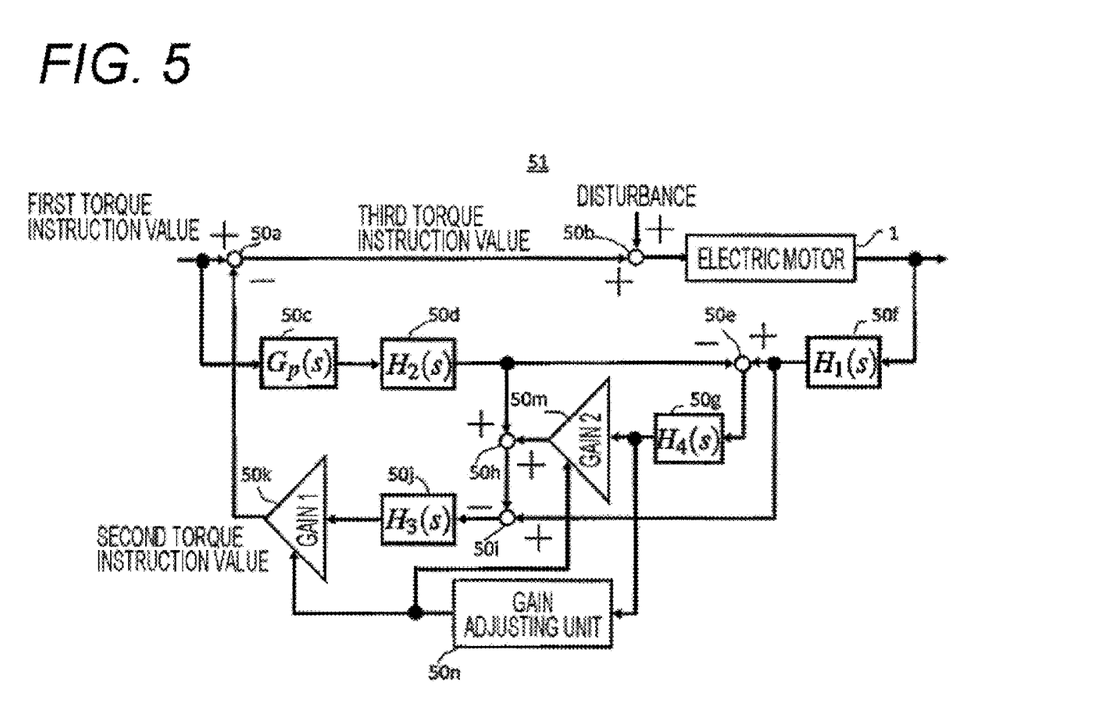
FIG. 5 is a configuration diagram of a damping control system according to a second embodiment.

FIG. 5 is a configuration diagram of a damping control system 51 according to the second embodiment.

An electric vehicle to which the second embodiment is applied is the same in configuration as the electric vehicle to which the first embodiment is applied, and therefore illustration and detailed description of the electric vehicle to which the second embodiment is applied is omitted.

The damping control system 51 of the second embodiment shown in FIG. 5 is different from the damping control system 50 of the first embodiment shown in FIG. 2 in that the damping control system 51 of the second embodiment includes a second amplifier 50*m* and a gain adjusting unit 50*n*, which are added to the damping control system 50 of the first embodiment.

The second amplifier 50*m* amplifies an output value from the low-pass filter 50*g* at a gain adjusted by the gain adjusting unit 50*n*, and outputs the amplified output value to the second adder 50*h*. The gain adjusting unit 50*n* adjusts respective gains of the first amplifier 50*k* and the second amplifier 50*m*, according to an output value from the low-pass filter 50*g*.

Due to the phase characteristics of the low-pass filter 50*g*, in some cases, a torque that may hinder other control operations is created when an ABS is actuated. To prevent such a case, an output value from the low-pass filter 50*g* is reduced by adjusting the gain of the second amplifier 50*m* to prevent creation of a torque that may hinder other control operations.

The gain of second amplifier 50*m* is adjusted by the gain adjusting unit 50*n*.

The gain adjusting unit 50*n* adjusts the gain of the first amplifier 50*k* as well. By adjusting the gain of the first amplifier 50*k* to reduce the gain, unexpected torque variations caused by fast changes in the motor speed are reduced. This suppresses an influence on other control operation.

Figure 6:
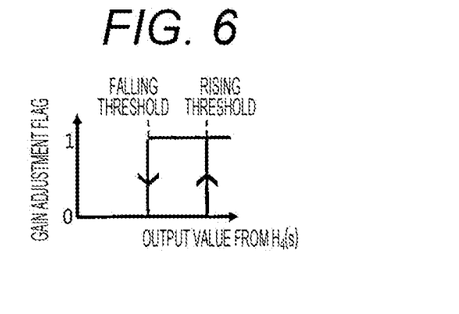
FIG. 6 is an operation explanation diagram of a gain adjusting unit.

FIG. 6 is an operation explanation diagram of the gain adjusting unit 50*n*. In FIG. 6, when an output value from the low-pass filter 50*g* becomes larger than a preset rising threshold, the gain adjusting unit 50*n* reduces a gain 1 of first amplifier 50*k* and a gain 2 of the second amplifier 50*m*. Reducing the gain 2 results in a reduction in the influence of the low-pass filter 50*g*. This prevents a case where due to the phase characteristics of the low-pass filter 50*g*, a torque that may hinder other control operations is created when the ABS is actuated.

In addition, reducing the gain of the first amplifier 50*k* results in a reduction in the influence of damping control on the electric vehicle, in which case hinderance to other control operations is suppressed. This prevents a case where a torque instruction for damping control causes a drop in braking performance when the ABS is actuated, thus preventing a problem of an increase in a stopping distance.

Figure 7:
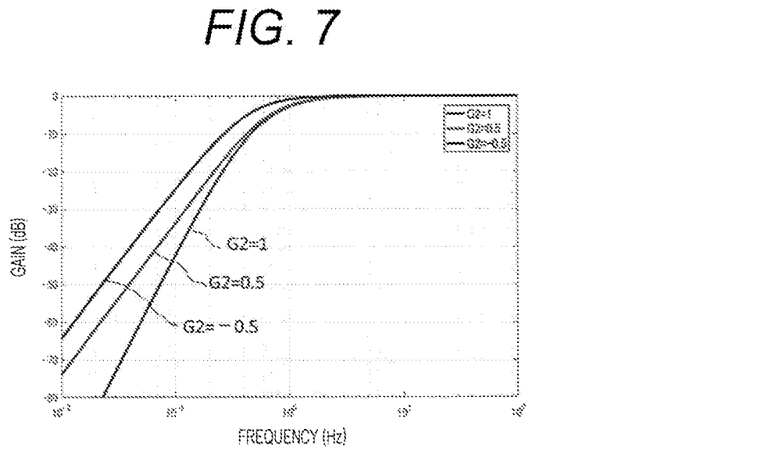
FIG. 7 is a graph showing changes in the frequency characteristics of a low-pass filter, the changes being caused by adjustment of a gain of a second amplifier.
Figure 8:
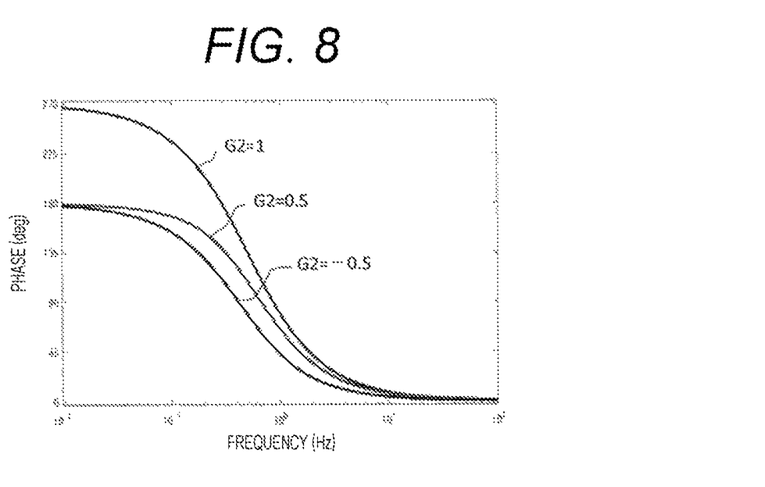
FIG. 8 is a graph showing changes in the phase-dependent frequency characteristics of the low-pass filter, the changes being caused by changes in a gain of the second amplifier.

FIG. 7 is a graph showing changes in respective amplitude characteristics of the first high-pass filter 50*f*, the second high-pass filter 50*d*, and the third high-pass filter 50*j*, the changes being caused by adjustment of the gain of the second amplifier 50*m*, and FIG. 8 is a graph showing changes in respective phase characteristics of the first high-pass filter 50*f*, the second high-pass filter 50*d*, and the third high-pass filter 50*j*, the changes being caused by adjustment of the gain of the second amplifier 50*m*.

FIGS. 7 and 8 show changes in frequency characteristics in a case where the gain of the second amplifier $50_m$ is defined as G2 and G2 is changed to 1, 2, and −0.5.

As shown in FIGS. 7 and 8, by adjusting the gain of the second amplifier 50*m*, respective phase characteristics of the first high-pass filter 50*f*, the second high-pass filter 50*d*, and the third high-pass filter 50*j* can be changed.

Figure 9:
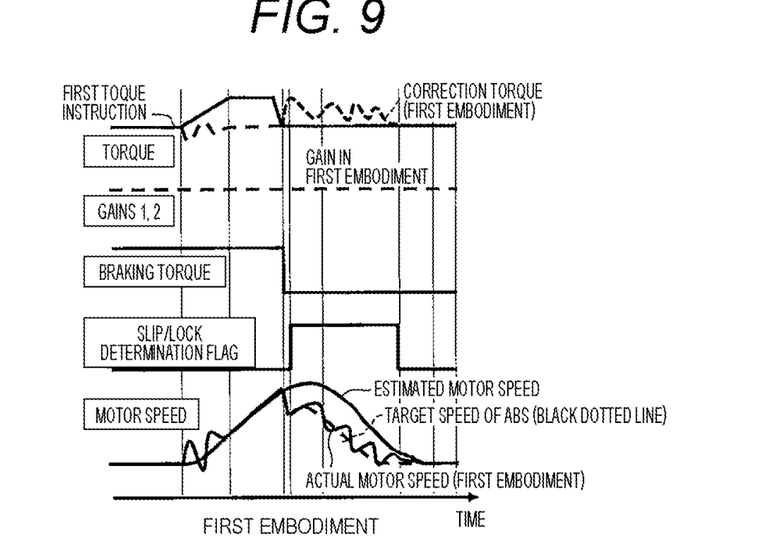
FIG. 9 is a waveform chart for comparing an operation in the first embodiment of the present invention with an operation in the second embodiment of the same.
Figure 10:
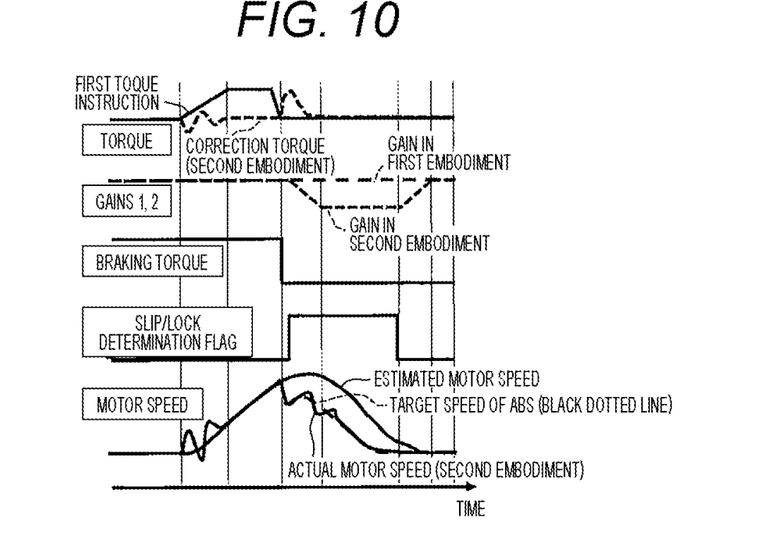
FIG. 10 is a waveform chart for comparing an operation in the first embodiment of the present invention with an operation in the second embodiment of the same.

FIGS. 9 and 10 are waveform charts for comparing an operation in the first embodiment with an operation in the second embodiment.

In FIG. 9, the gain does not change because no gain adjustment is made in the first embodiment. In FIG. 10, on the other hand, the gain changes because gain adjustment is made in the second embodiment.

As a result, a difference between a correction torque of the second embodiment and the first torque instruction is smaller than a difference between a correction torque of the first embodiment and the first torque instruction, and variations in the correction torque of the second embodiment are smaller, too. In addition, a difference between the actual motor speed of the second embodiment and a target speed of the ABS is smaller than a difference between the actual motor speed of the first embodiment and the target speed of the ABS, and variations in the actual motor speed of the second embodiment are smaller, too.

Actually, however, the first high-pass filter 50*f* and the second high-pass filter 50*d* work in such a way as to prevent divergence of an estimate by the motor speed estimator 50*c*. As a result, an actual waveform of the estimated motor speed turns out to be different from the waveforms of the estimated motor speed shown in FIGS. 9 and 10. FIGS. 9 and 10 show waveforms simplified for understanding of effects of the second embodiment.

The second embodiment of the present invention offers the same effects as the first embodiment offers, and offers an additional effect of preventing creation of a torque that may hinder an anti-slip control operation at the occurrence of a slip incident.

It should be noted that the configuration of the damping control system is not limited to that of the damping control system 51 shown in FIG. 5 and may be a different configuration that is equivalent in terms of control performance to the configuration of the damping control system 51, providing that such a configuration offers the same effects as the damping control system 51 shown in FIG. 5 offers.

Third Embodiment

A third embodiment of the present invention will then be described.

The third embodiment of the present invention is an example in which the present invention is applied to a four-wheel drive vehicle.

Figure 11:
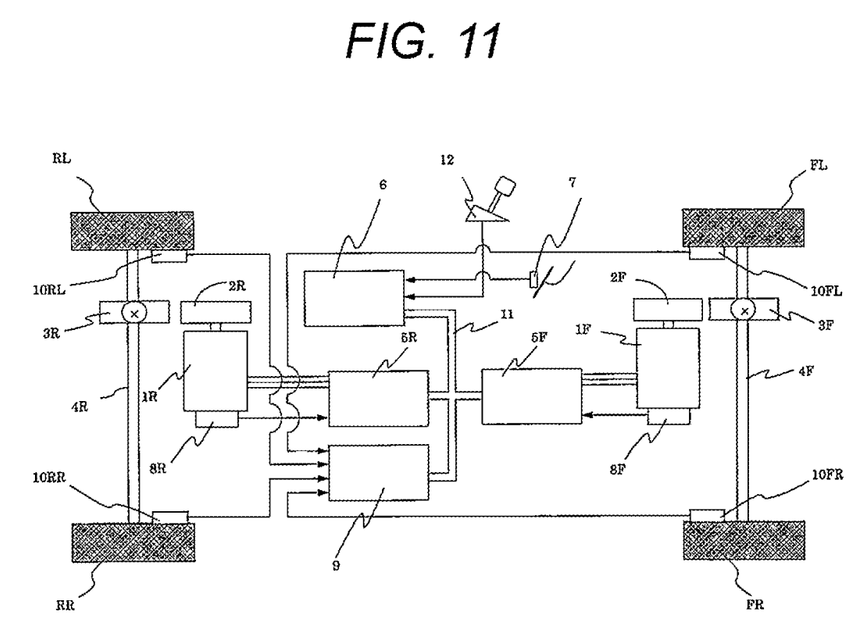
FIG. 11 is a schematic configuration diagram of an electric vehicle to which a motor control device according to a third embodiment of the present invention is applied.

FIG. 11 is a schematic configuration diagram of an electric vehicle to which a motor control device according to the third embodiment of the present invention is applied.

In the example shown in FIG. 11, a rear wheel electric motor 1R, a rear-wheel speed-reducing mechanism 2R, a rear-wheel differential gear 3R, a drive shaft 4R, a rear-wheel inverter 5R, and a rear-wheel resolver 8R are added to the electric vehicle shown in FIG. 1.

It should be noted that in FIG. 11, the electric motor 1, the speed-reducing mechanism 2, the differential gear 3, the drive shaft 4, the inverter 5, and the resolver 8, which are shown in FIG. 1, are referred to respectively as a front wheel electric motor 1F, a speed-reducing mechanism 2F, a front wheel differential gear 3F, a front wheel drive shaft 4F, a front wheel inverter 5F, and a front wheel resolver 8F for convenience in description of the third embodiment.

In FIG. 11, to the rear wheel electric motor 1R, the differential gear 3R is connected via the speed-reducing mechanism 2R. To the differential gear 3R, the drive shaft 4R is connected. To the drive shaft 4R, the rear wheels RL and RR are connected.

To the rear wheel electric motor 1R, power is supplied from a high-voltage battery (not illustrated) via the inverter 5R. The inverter 5R is driven under control by the vehicle controller 6 and the control unit in the inverter 5.

The brake controller 9 is connected to the wheel speed sensors 10FL, 10FR, 10RL, and 10RR attached respectively to the wheels RL, and RR, and receives respective rotation speed signals from the wheels FL, FR, RL, and RR. The brake controller 9 adjusts the amount of a brake fluid supplied to respective brake units of the wheels FL, FR, RL, and RR, based on an amount of the driver's braking operation, thus controlling respective braking torques of the wheels FL, FR, RL, and RR.

Information communication between the rear-wheel inverter 5R, the vehicle controller 6, and the brake controller 9 is carried out through the CAN communication line (communication device) 11.

Other operations of the electric vehicle shown in FIG. 11 are the same as those of the electric vehicle shown in FIG. 1.

In a case where the present invention is applied to a four-wheel drive vehicle, equipping the vehicle with another damping control unit 500 for driving the rear wheels, in addition to the damping control unit 500 for driving the front wheels shown in FIG. 2, is considered to be a proper approach.

However, when the vehicle is just equipped with another damping control unit 500, a case where preferable operation control cannot be carried out is bound to occur. The following is the reasons.

Figure 12:
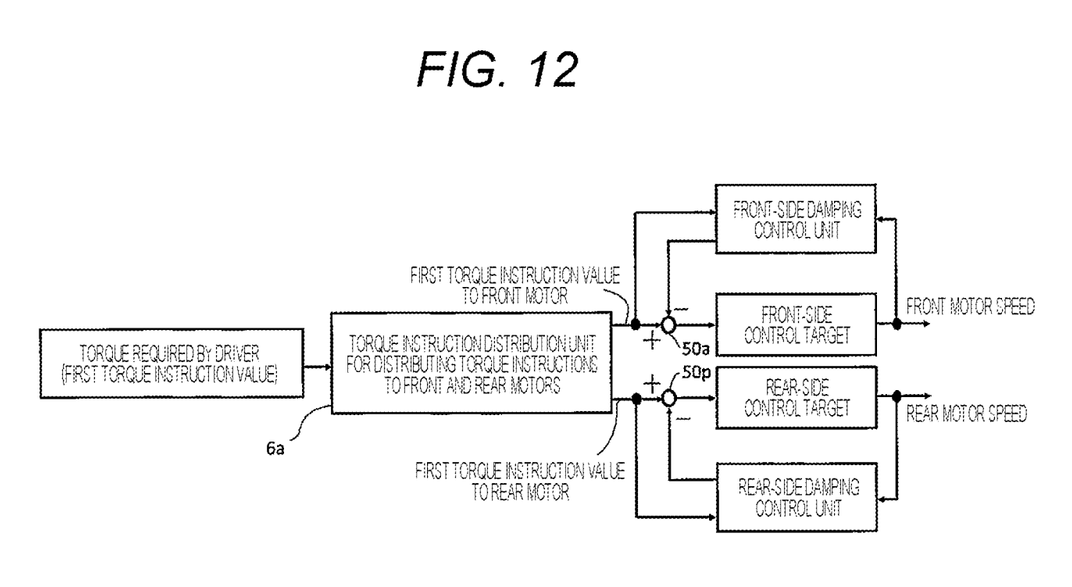
FIG. 12 is a schematic configuration explanatory diagram of an electric vehicle equipped with another damping control unit for driving rear wheels, in addition to the damping control unit for driving front wheels shown in FIG. 2.

FIG. 12 is a schematic configuration explanatory diagram of an electric vehicle equipped with another damping control unit 500 for driving the rear wheels, in addition to the damping control unit 500 for driving the front wheels shown in FIG. 2.

In FIG. 12, when a first torque instruction value requested by the driver is outputted, a torque instruction distribution unit 6a for distributing torque instructions to the front and rear motors, the torque instruction distribution unit 6a being included in the controller 6, outputs the first torque instruction value to be given to the front wheel electric motor 1F, which is a front motor, to the front wheel electric motor 1F, which is a front-side control target, via the first subtractor 50a. A front-side damping control unit 500F (which is equivalent in configuration to the damping control unit 500 and is a front-side control unit, and is therefore referred to as front-side damping control unit 500F) outputs a front motor speed from the front-side control target and the first torque instruction value to the front motor 1F. The front-side damping control unit 500F then outputs a feedback signal to the first subtractor 50a.

The torque instruction distribution unit 6a for distributing torque instructions to the front wheel electric motor 1F and rear wheel electric motor 1R outputs the first torque instruction value to be given to the rear wheel electric motor 1R, which is a rear motor, to the rear wheel electric motor 1R, via a fourth subtractor 50p. A rear-side damping control unit 500R (which is equivalent in configuration to the damping control unit 500 and is a rear-side control unit, and is therefore referred to as rear-side damping control unit 500R) outputs a rear motor speed from a rear-side control target and the first torque instruction value to the rear motor 1R. The rear-side damping control unit 500R then outputs a feedback signal to the fourth subtractor 50p.

The motor speed estimator 50c included in the front-side damping control unit 500F and the motor speed estimator 50c included in the rear-side damping control unit 500R each estimates a motor speed. In the configuration shown in FIG. 12, however, these motor speed estimators 50c can estimate only the motor speeds for the torque instructions to the electric motors 1F and 1R, respectively.

Matter of fact, however, the actual motor speed is determined by the sum of the torque instruction values to the front wheel electric motor 1F and rear wheel electric motor 1R (that is, the torque required by the driver).

For this reason, in the configuration shown in FIG. 12, a gap arises between the motor speed estimated by the front-side damping control unit 500F and the actual motor speed and between the motor speed estimated by the rear-side damping control unit 500R and the actual motor speed. This raises a concern that erroneous correction made may hinder acceleration/deceleration operations.

Figure 13:
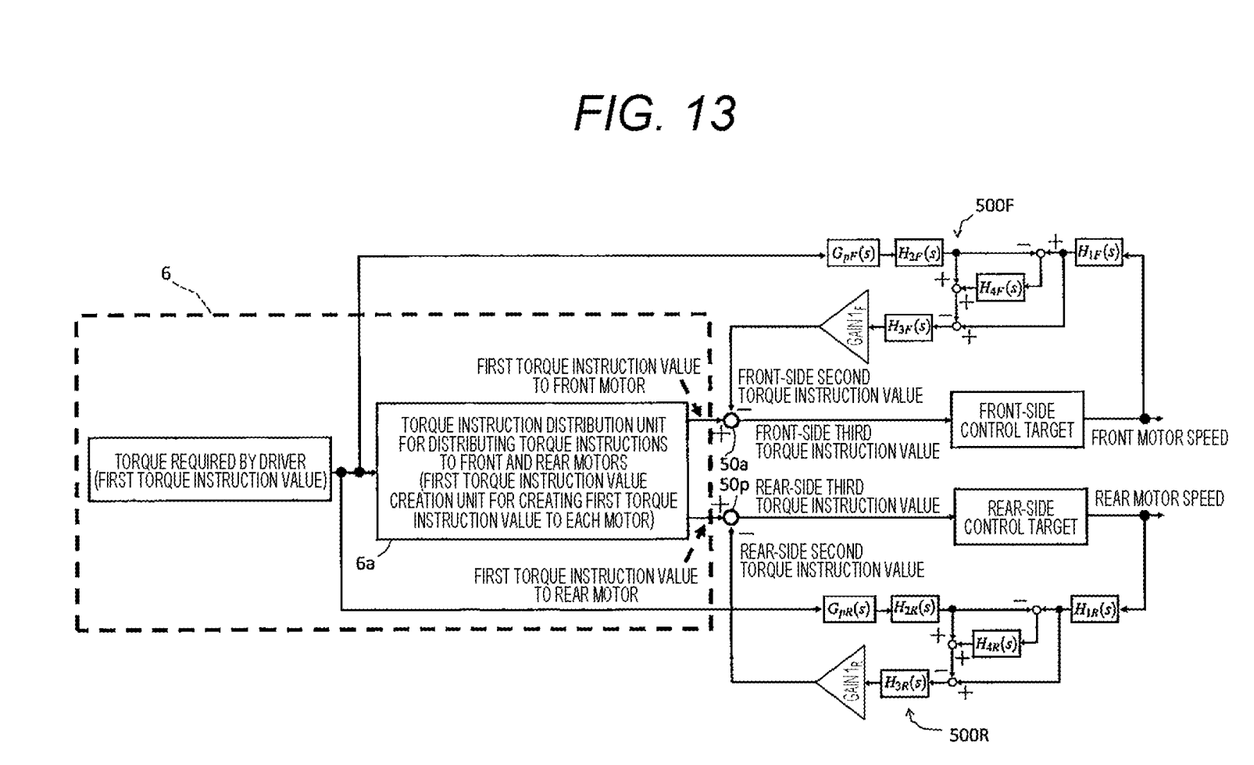
FIG. 13 is a schematic configuration diagram of a motor control device according to the third embodiment in which the present invention is applied to a four-wheel drive vehicle.

FIG. 13 is a schematic configuration diagram of a motor control device according to the third embodiment in which the present invention is applied to a four-wheel drive vehicle.

In FIG. 13, the first torque instruction value required by the driver is inputted to the torque instruction distribution unit 6a for distributing torque instructions to the front wheel electric motor and rear wheel electric motor, the torque instruction distribution unit 6a being included in the controller 6.

The first torque instruction value required by the driver is outputted to the torque instruction distribution unit 6a and is inputted to the front-side damping control unit (front wheel damping control unit) 500F and to the rear-side damping control unit (rear wheel damping control unit) 500R as well.

The torque instruction distribution unit 6a outputs the first torque instruction value to be given to the front wheel electric motor 1F, which is the front motor, to the front wheel electric motor 1F, which is the front-side control target, via the first subtractor 50a. The front-side damping control unit 500F receives input of the front motor speed from the front-side control target. The front-side damping control unit 500F then outputs a feedback signal to the first subtractor 50a.

The torque instruction distribution unit 6a for distributing torque instructions to the front and rear motors outputs the first torque instruction value to be given to the rear wheel electric motor 1R, which is the rear motor, to the rear wheel electric motor 1R, which is the rear-side control target, via the fourth subtractor 50p. The rear-side damping control unit 500R receives input of the rear motor speed from the rear-side control target. The rear-side damping control unit 500R then outputs a feedback signal to the fourth subtractor 50p.

Now the motor speed estimators 50c included respectively in the front-side damping control unit 500F and the rear-side damping control unit 500R shown in FIG. 13 are each able to estimate the motor speed that is based on the sum of the torque instruction values to the front wheel electric motor 1F and rear wheel electric motor 1R (that is, the torque required by the driver) as the actual motor speed is.

As a result, a problematic gap between the motor speed estimated by the front-side damping control unit 500F and the actual motor speed and between the motor speed estimated by the rear-side damping control unit 500R and the actual motor speed can be reduced, the gap arising when the motor speed is estimated by the front-side damping control unit 500F and by the rear-side damping control unit 500R based only on the torque instruction value from the torque instruction distribution unit 6a, can be reduced. This prevent a case where erroneous correction made hinders acceleration/deceleration operations.

The third embodiment of the present invention offers the same effects as the first embodiment offers when applied to a four-wheel drive vehicle.

In the above third embodiment, the damping control unit 500 shown in the first embodiment is used as the front-side damping control unit 500F and as the rear-side damping control unit 500R. However, the damping control unit shown in FIG. 5 (second embodiment), which is constructed by adding the second amplifier 50m and the gain adjusting unit 50n to the damping control unit 500 shown in FIG. 1, may be used as the front-side damping control unit 500F and as the rear-side damping control unit 500R. In this case, the third embodiment offers the same effects as the second embodiment when applied to a four-wheel drive vehicle.

REFERENCE SIGNS LIST 1, 1F, 1R electric motor
2, 2F, 2R speed-reducing mechanism
3, 3F, 3R differential gear
4, 4F, 4R drive shaft
5, 5F, 5R inverter
6 controller
6a torque instruction distribution unit
7 accelerator opening sensor
8, 8F, 8R resolver
9 brake controller
10FL, 10FR, 10RL, 10R wheel speed sensor
11 CAN communication line
12 shift lever
50, 51 damping control system
50a first subtractor
50b first adder
50c motor speed estimator
50d second high-pass filter
50e second subtractor
50f first high-pass filter
50g low-pass filter
50h second adder
50i third subtractor
50j third high-pass filter
50k first amplifier
50m second amplifier
50n gain adjusting unit
50p fourth subtractor
500, 500F, 500R damping control unit

The invention claimed is:

1. A motor control device comprising:
a controller that outputs a first torque instruction signal that is an instruction to specify a torque of an electric motor; and
a damping control unit,
wherein the damping control unit includes:
   a first high-pass filter that receives input of a motor speed signal indicating a speed of the electric motor, the first high-pass filter outputting a first signal;
   a second high-pass filter that receives input of an estimated motor speed signal obtained from the first torque instruction signal, the second high-pass filter outputting a second signal; and
   a low-pass filter that receives input of a motor speed deviation signal indicating a deviation between the first signal and the second signal, the low-pass filter obtaining a low-frequency component from the motor speed deviation signal and outputting the low-frequency component as a third signal,
wherein a signal given by adding up the second signal and the third signal is subtracted from the first signal to obtain a feedback signal, and a second torque instruction signal obtained based on the feedback signal is fed back to the first torque instruction signal and is outputted to the electric motor, as a third torque instruction signal.

2. A motor control device comprising:
a controller that outputs a first torque instruction signal that is an instruction to specify a torque of an electric motor; and
a damping control unit,
wherein the damping control unit includes:
   a first high-pass filter that receives input of a motor speed signal indicating a speed of the electric motor, the first high-pass filter outputting a first signal;
   a second high-pass filter that receives input of an estimated motor speed signal obtained from the first torque instruction signal, the second high-pass filter outputting a second signal;
   a low-pass filter that receives input of a motor speed deviation signal indicating a deviation between the first signal and the second signal, the low-pass filter obtaining a low-frequency component from the motor speed deviation signal and outputting the low-frequency component as a third signal;
   a third high-pass filter to which a feedback signal is inputted; and
   a first amplifier to which an output signal from the third high-pass filter is inputted,
wherein a signal given by adding up the second signal and the third signal is subtracted from the first signal to obtain the feedback signal, and a second torque instruction signal obtained based on the feedback signal is fed back to the first torque instruction signal and is outputted to the electric motor, as a third torque instruction signal,
wherein the second torque instruction signal is outputted from the first amplifier.

3. A motor control device comprising:
a controller that outputs a first torque instruction signal that is an instruction to specify a torque of an electric motor; and
a damping control unit,
wherein the damping control unit includes:
   a first high-pass filter that receives input of a motor speed signal indicating a speed of the electric motor, the first high-pass filter outputting a first signal;
   a second high-pass filter that receives input of an estimated motor speed signal obtained from the first torque instruction signal, the second high-pass filter outputting a second signal;
   a low-pass filter that receives input of a motor speed deviation signal indicating a deviation between the first signal and the second signal, the low-pass filter obtaining a low-frequency component from the motor speed deviation signal and outputting the low-frequency component as a third signal;
   a third high-pass filter to which a feedback signal is inputted;
   a first amplifier to which an output signal from the third high-pass filter is inputted;
   a second amplifier to which the third signal is inputted; and
   a gain adjusting unit that according to an output signal from the low-pass filter, adjusts a gain of the first amplifier and a gain of the second amplifier,
wherein a signal given by adding up the second signal and the third signal is subtracted from the first signal to obtain the feedback signal, and a second torque instruction signal obtained based on the feedback signal is fed back to the first torque instruction signal and is outputted to the electric motor, as a third torque instruction signal, wherein the second torque instruction signal is outputted from the first amplifier, wherein an output signal from the second amplifier is added to the second signal, as the third signal.

4. A motor control device comprising:
a controller that outputs a first torque instruction signal that is an instruction to specify a torque of an electric motor; and
a damping control unit,
wherein the damping control unit includes:
   a first high-pass filter that receives input of a motor speed signal indicating a speed of the electric motor, the first high-pass filter outputting a first signal;
   a second high-pass filter that receives input of an estimated motor speed signal obtained from the first torque instruction signal, the second high-pass filter outputting a second signal;
   a low-pass filter that receives input of a motor speed deviation signal indicating a deviation between the first signal and the second signal, the low-pass filter obtaining a low-frequency component from the motor speed deviation signal and outputting the low-frequency component as a third signal;
   a third high-pass filter to which a feedback signal is inputted;
   a first amplifier to which an output signal from the third high-pass filter is inputted;
   a second amplifier to which the third signal is inputted; and
   a gain adjusting unit that according to an output signal from the low-pass filter, adjusts a gain of the first amplifier and a gain of the second amplifier,
wherein a signal given by adding up the second signal and the third signal is subtracted from the first signal to obtain the feedback signal, and a second torque instruction signal obtained based on the feedback signal is fed back to the first torque instruction signal and is outputted to the electric motor, as a third torque instruction signal,
wherein the second torque instruction signal is outputted from the first amplifier,
wherein an output signal from the second amplifier is added to the second signal, as the third signal,
wherein when an output signal from the low-pass filter becomes larger than a preset rising threshold, the gain adjusting unit reduces a gain of the first amplifier and a gain of the second amplifier.

5. A motor control device for a four-wheel drive vehicle comprising:
a controller that outputs a first torque instruction signal that is an instruction to specify a torque of an electric motor;
a damping control unit,
wherein the damping control unit includes;
   a first high-pass filter that receives input of a motor speed signal indicating a speed of the electric motor, the first high-pass filter outputting a first signal;
   a second high-pass filter that receives input of an estimated motor speed signal obtained from the first torque instruction signal, the second high-pass filter outputting a second signal; and
   a low-pass filter that receives input of a motor speed deviation signal indicating a deviation between the first signal and the second signal, the low-pass filter obtaining a low-frequency component from the motor speed deviation signal and outputting the low-frequency component as a third signal;
wherein a signal given by adding up the second signal and the third signal is subtracted from the first signal to obtain a feedback signal, and a second torque instruction signal obtained based on the feedback signal is fed back to the first torque instruction signal and is outputted to the electric motor, as a third torque instruction signal, and
the electric motor includes:
   a front wheel electric motor, and
   a rear wheel electric motor, and
the damping control unit further includes;
   a front wheel damping control unit that outputs a torque instruction signal to the front wheel electric motor, and
   a rear wheel damping control unit that outputs a torque instruction signal to the rear wheel electric motor,
the motor control device further comprising a torque instruction value distribution unit that receives input of the first torque instruction signal, the torque instruction value distribution unit outputting a first torque instruction signal for the front wheel electric motor, to the front wheel damping control unit and outputting a first torque instruction signal for the rear wheel electric motor, to the rear wheel damping control unit,
wherein the first torque instruction signal is outputted to the torque instruction value distribution unit and is outputted to the front wheel damping control unit and to the rear wheel damping control unit as well.

6. A motor controlling method comprising:
outputting a first torque instruction signal from a controller, the first torque instruction signal being an instruction to specify a torque of an electric motor;
inputting a motor speed signal to a first high-pass filter, the motor speed signal indicating a speed of the electric motor, and outputting a first signal;
inputting an estimated motor speed signal obtained from the first torque instruction signal, to a second high-pass filter and outputting a second signal;
inputting a motor speed deviation signal to a low-pass filter, the motor speed deviation signal indicating a deviation between the first signal and the second signal, and obtaining a low-frequency component from the motor speed deviation signal to output the low-frequency component, as a third signal;
subtracting a signal given by adding up the second signal and the third signal from the first signal to obtain a feedback signal; and
feeding back a second torque instruction signal obtained based on the feedback signal to the first torque instruction signal and outputting the fed back second torque instruction signal to the electric motor, as a third torque instruction signal.

7. A motor controlling method comprising:
outputting a first torque instruction signal from a controller, the first torque instruction signal being an instruction to specify a torque of an electric motor;
inputting a motor speed signal to a first high-pass filter, the motor speed signal indicating a speed of the electric motor, and outputting a first signal;
inputting an estimated motor speed signal obtained from the first torque instruction signal, to a second high-pass filter and outputting a second signal;
inputting a motor speed deviation signal to a low-pass filter, the motor speed deviation signal indicating a deviation between the first signal and the second signal, and obtaining a low-frequency component from the motor speed deviation signal to output the low-frequency component, as a third signal;

subtracting a signal given by adding up the second signal and the third signal from the first signal to obtain a feedback signal;

feeding back a second torque instruction signal obtained based on the feedback signal to the first torque instruction signal and outputting the fed back second torque instruction signal to the electric motor, as a third torque instruction signal;

inputting the feedback signal to a third high-pass filter;

inputting an output signal from the third high-pass filter, to a first amplifier; and outputting the second torque instruction signal from the first amplifier.

8. A motor controlling method comprising:

outputting a first torque instruction signal from a controller, the first torque instruction signal being an instruction to specify a torque of an electric motor;

inputting a motor speed signal to a first high-pass filter, the motor speed signal indicating a speed of the electric motor, and outputting a first signal;

inputting an estimated motor speed signal obtained from the first torque instruction signal, to a second high-pass filter and outputting a second signal;

inputting a motor speed deviation signal to a low-pass filter, the motor speed deviation signal indicating a deviation between the first signal and the second signal, and obtaining a low-frequency component from the motor speed deviation signal to output the low-frequency component, as a third signal;

subtracting a signal given by adding up the second signal and the third signal from the first signal to obtain a feedback signal;

feeding back a second torque instruction signal obtained based on the feedback signal to the first torque instruction signal and outputting the fed back second torque instruction signal to the electric motor, as a third torque instruction signal;

inputting the feedback signal to a third high-pass filter;

inputting an output signal from the third high-pass filter, to a first amplifier;

outputting the second torque instruction signal from the first amplifier;

inputting the third signal to a second amplifier;

causing a gain adjusting unit to adjust a gain of the first amplifier and a gain of the second amplifier according to an output signal from the low-pass filter; and adding an output signal from the second amplifier to the second signal, the output signal being added as the third signal.

* * * * *